UNITED STATES PATENT OFFICE.

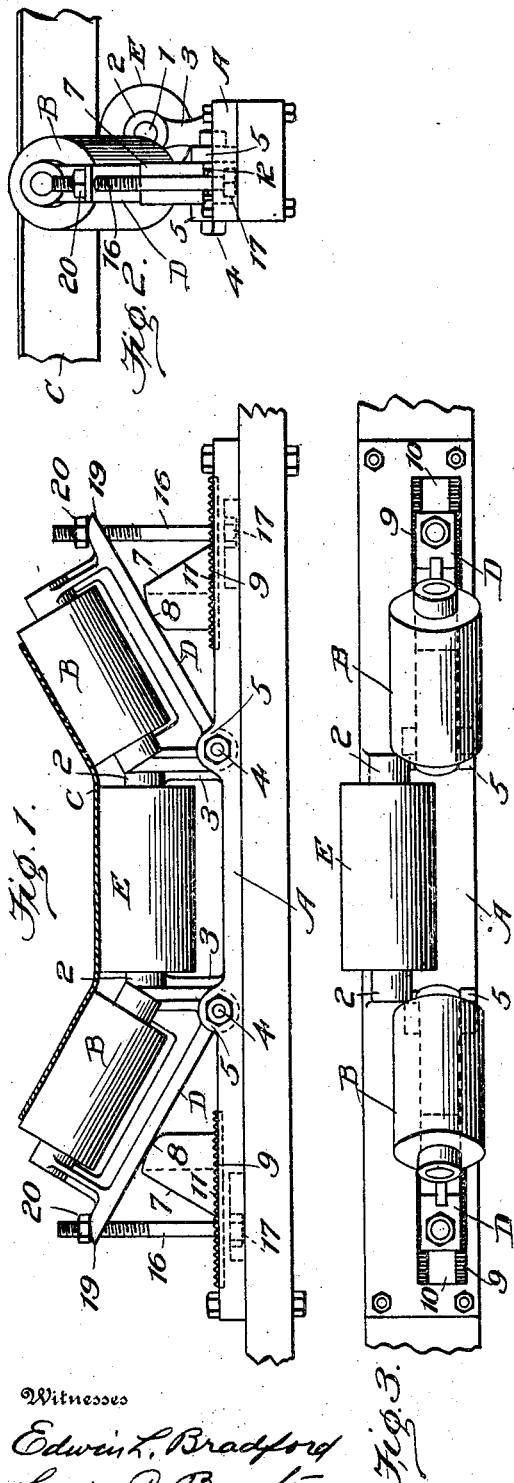

ARCHIBALD W. F. STECKEL, OF COLUMBUS, OHIO, ASSIGNOR TO JOSEPH A. JEFFREY, OF COLUMBUS, OHIO.

CONVEYER-BELT SUPPORT.

No. 809,227.      Specification of Letters Patent.      Patented Jan. 2, 1906.

Application filed June 20, 1904. Serial No. 213,402.

*To all whom it may concern:*

Be it known that I, ARCHIBALD W. F. STECKEL, a citizen of the United States, residing at Columbus, in the county of Franklin and State of Ohio, have invented certain new and useful Improvements in Conveyer-Belt Supports, of which the following is a specification, reference being had therein to the accompanying drawings.

My invention relates to that class of conveyers in which idler pulleys or rollers are employed for giving to a conveying-belt a trough-like form for the purpose of better retaining the material conveyed within the edges of the belt.

The invention consists in the parts and combinations thereof hereinafter set forth.

In order to make the invention more clearly understood, I have shown in the accompanying drawings means for carrying the same into practical effect without limiting my improvements in their useful applications to the particular constructions which for the sake of illustration I have delineated.

In said drawings, Figure 1 is an elevation of a conveyer-belt support embodying my invention. Fig. 2 is a side view of the same. Fig. 3 is a plan view. Fig. 4 is an elevation, and Fig. 5 a side view of a slightly different construction of the support also embodying the invention.

Referring to the drawings, A indicates a base, such as a metallic casting; B, two inclined supports adapted to sustain the outer parts of a conveying-belt C; D, the carriers for said inclined supports, and E an intermediate support for the middle part of the belt. Said inclined and intermediate supports are preferably idler pulleys or rollers, as shown; but it will be understood that all the features of my invention are not limited to making said suppports of a revoluble character. The intermediate support or roller E is ordinarily horizontal and is mounted on a shaft or end journals 1, held in bearings 2. The latter are carried by brackets 3 on the base A. The carriers D are so mounted on the base as to be movable up and down to elevate or lower the rollers B and the edges of the belt C according to the requirements of the conveying operation, such as the nature and quantity of the material to be conveyed. To this end the carriers D are connected with the base by a hinge or fulcrum, such as a longitudinal pivot-pin 4, passing through bearings 5 on the base and bearings 6 on the carriers. On these pivots the carriers are adjustable by suitable devices capable of ready operation and of securely holding the carriers D and pulleys B in their adjusted position, such as inwardly and outwardly movable slides 7, operating in directions transverse to the belt and interposed between the carriers and the base and supporting the carriers D from beneath by cam-like bearings 8. The transverse movement of the slides may be effected by different instrumentalities, of which I have illustrated two. In Figs. 1 to 3 the base is provided with a toothed rack 9, having a central guideway 10, and the slide is formed with corresponding teeth 11 and with a downward projection 12, adapted to fit said guideway. The adjustment of this form of slide is by hand, and it will be held in place when adjusted by its weight and that of the superincumbent parts. In Figs. 4 and 5 the slides 7' are adapted to be moved transversely by screws 13, bearing against their outer ends and adjustable in threaded bearings 14 on the base A. Lock-nuts 15 serve to secure the screws in adjusted position. I provide further for forcing and holding down the carriers D, which is accomplished by bolts 16, having their heads engaging beneath the base or a portion thereof at 17, extending up through slots 18 in the slides and passing through openings 19 in the carriers. Above said openings nuts 20 on said bolts serve to force or hold down the carriers, combining with the rack-teeth or screws 13 to firmly clamp the slides.

What I claim is—

1. In a conveyer, a belt-support consisting of the combination of two inclined pulleys, a movable carrier for each of said pulleys operable up and down in planes transverse to the belt, an intermediate support for the belt independent of said pulleys, and means for operating said carriers to adjust said inclined pulleys relative to said intermediate support.

2. In a conveyer, a belt-support consisting of the combination of two inclined pulleys, a carrier for each of said pulleys mounted on a hinge or fulcrum, the axis of which is longitudinal of the belt, an intermediate support for the belt independent of said pulleys, and means for adjusting the said carriers around their longitudinal axes to change the positions of said pulleys relative to said intermediate support.

3. In a conveyer, a belt-support consisting of the combination of two inclined pulleys, a carrier for each of said pulleys mounted on a longitudinal hinge or fulcrum and having inner and outer bearings for the inner and outer ends of the pulley shafts or journals, an intermediate support for the belt, and means for adjusting the said carriers around their longitudinal hinges.

4. In a conveyer, a belt-support consisting of the combination of two inclined pulleys, a carrier for each of said pulleys, adjustable up and down, and transversely-movable slides engaging said carriers for adjusting the latter.

5. In a conveyer, a belt-support consisting of the combination of two inclined pulleys, a carrier for each of said pulleys mounted on a longitudinal axis or fulcrum, means for forcing and holding said carriers downward, and means for forcing and holding said carriers upward.

6. In a conveyer, the combination of two inclined pulleys, a base, a carrier for each of said pulleys, movably supported on a hinge or fulcrum on said base, and inwardly and outwardly movable slides interposed between said carriers and the base.

7. In a conveyer, a belt-support consisting of the combination of two inclined pulleys, a base, a carrier for each of said pulleys, movably supported on a hinge or fulcrum on said base, inwardly and outwardly movable slides interposed between said carriers and the base, and connections between the base and said carriers for holding the latter downward.

8. In a mechanism of the class described, the combination with a suitable frame and a conveyer-belt arranged thereon, of a plurality of pulleys designed to support the central portion of said belt, pulleys arranged at the ends of said central pulleys designed to support the edges of said belt, means for adjusting said end pulleys to diagonal planes, and means for locking the same in such positions, substantially as set forth.

In testimony whereof I affix my signature in presence of two witnesses.

ARCHIBALD W. F. STECKEL.

Witnesses:
C. H. ANTHONY,
F. C. BOZENHARD.